(12) United States Patent
Billiot

(10) Patent No.: US 7,057,513 B2
(45) Date of Patent: Jun. 6, 2006

(54) RF TRANSMISSION—RECEPTION DEVICE

(75) Inventor: Gerard Billiot, Saint-Nazaire-les-Eymes (FR)

(73) Assignee: Commissariat a l'Energie Atomique, Paris (FR)

(*) Notice: Subject to any disclaimer, the term of this patent is extended or adjusted under 35 U.S.C. 154(b) by 119 days.

(21) Appl. No.: 10/819,947

(22) Filed: Apr. 8, 2004

(65) Prior Publication Data

US 2004/0214523 A1 Oct. 28, 2004

(30) Foreign Application Priority Data

Apr. 23, 2003 (FR) .................................. 03 50122

(51) Int. Cl.
*G08B 13/14* (2006.01)

(52) U.S. Cl. .............................. 340/572.4; 340/539.16; 340/10.1; 455/127.1; 455/572

(58) Field of Classification Search ............. 340/572.4, 340/870.07, 870.44, 870.02, 870.03, 310.01, 340/10.1, 636.1, 636.12, 636.13, 539.1; 327/355, 327/356; 455/127, 116, 315, 572, 127.1; 713/500, 300, 324, 323, 320

See application file for complete search history.

(56) References Cited

U.S. PATENT DOCUMENTS

| 5,929,776 A | * | 7/1999 | Warble et al. ............. 340/7.32 |
| 6,049,292 A |   | 4/2000 | Einfeldt et al. |
| 6,259,301 B1 | * | 7/2001 | Gailus et al. ............... 327/355 |
| 6,266,545 B1 | * | 7/2001 | Backman et al. ........... 455/572 |
| 6,281,758 B1 | * | 8/2001 | Elsayed et al. ............... 331/16 |
| 6,300,881 B1 | * | 10/2001 | Yee et al. ............. 340/870.02 |
| 2002/0008611 A1 |   | 1/2002 | Wuidart |

* cited by examiner

*Primary Examiner*—Davetta W. Goins
(74) *Attorney, Agent, or Firm*—Oblon, Spivak, McClelland, Maier & Neustadt, P.C.

(57) ABSTRACT

This invention relates to an RF transmission-reception device an antenna, a transmission part that includes a power amplifier that outputs an RF signal with modulated power to the antenna, a reception part, a digital processing and interface module, in which the input signal is picked up at the reception part by taking a current sample at the power supply regulator to generate an image current of the current amplitude output by the antenna to the power amplifier.

4 Claims, 2 Drawing Sheets

RF TRANSMISSION—RECEPTION DEVICE

TECHNICAL DOMAIN

The invention relates to an RF transmission-reception device, for example a base station for the generation of an electromagnetic field to communicate with a portable module in the field of RFID (Radio Frequency Identification Device) labels.

STATE OF PRIOR ART

The case of such a base station will be considered in the remainder of this presentation for simplification reasons.

In the field of RFID labels, a remote powered system comprises:

a base station 10, and
a mobile module 20, or label, illustrated in FIG. 1.

The role of the base station 10 is to supply energy to the mobile module 20 and to communicate with it, through an antenna 11 called a "base antenna", using an electromagnetic wave for which the frequency (called the "carrier frequency") is usually located within the radio frequencies (RF) range. This type of base station 10 can communicate with its external environment (network, computer, etc.) through a wired connection.

The main role of the mobile module 20, that includes an inductance 25 associated with a control circuit 26, is to exchange the information that it contains, and possibly to modify this information to make measurements, when it is in the presence of a sufficiently strong electromagnetic field to operate. In this module, this field is picked up and is transformed into electrical energy by the inductance 25 called the "mobile antenna".

As illustrated in FIG. 1, the base station 10 comprises:
an antenna 11,
a transmission part 12,
a reception part 13, and
a processing and digital interface module 14 with an external interface 19.

The transmission part 12 comprises different modules in sequence to generate the electromagnetic field to supply the mobile module 20 with energy:
a power supply management module 15,
possibly a power supply regulator 16,
a power amplifier 17,
a filter module 18.

The transmission part 12 also comprises a modulation-coding module 21 that is connected to the power amplifier 17 and to the processing and digital interface module 14.

The power supply regulator 16 regulates the power supply voltage, limits the power supplied, etc., to supply a power supply with appropriate characteristics to the power amplifier 17.

Starting from the carrier signal and the modulation output by the modulation-coding module 21, the power amplifier 17 generates an RF signal with modulated power capable of being loaded by a low impedance antenna 11 (typically 50 ohms, but lower values are quite possible).

The filter module 18 matches the output signal from the power amplifier 17 to the load represented by the antenna 11, to filter this output signal if necessary as a function of the embodiment of this power amplifier 17.

The antenna 11 generates an electromagnetic field from signals output by the filter module 18. The characteristics of this antenna depend on the geometric shape of the field to be transmitted and the power of the amplifier 17.

The electromagnetic field is generated permanently throughout the duration of the communication between the base station 10 and the mobile module 20, due to permanent transmission of the carrier frequency by the base station 10.

The modulation-coding module 21 generates the RF signal to be transmitted (carrier frequency) according to the protocol and modulation-coding used. This modulation is usually an amplitude modulation of the carrier frequency.

The reception part 13 comprises:
a filter module 22 if necessary
a reception module 23.

The filter module 22 filters but also makes an amplitude matching so that it is correctly input into the reception module 23.

When the base station 10 is made using an integrated circuit, the integration limit is usually located between these two modules 22 and 23. The signal may be picked up on a node A with a high voltage, that cannot be applied directly onto the input pin of an integrated circuit. Therefore, an adaptor module 22 located outside this integrated circuit is necessary.

Within the context of exchanges between the base station 10 and the portable module 20, sequentially an exchange can be made on semi-duplex mode. Thus, during a transmission from the base station 10 to the portable module 20 (transmission phase), the amplitude modulated carrier frequency is transmitted according to the index and the rate of transmitted data. Thus, a carrier frequency of 13.56 MHz can be used with an amplitude modulation with index 10% at a rate of 106 kHz.

Due to the passive nature of the mobile module 20 which does not have any internal energy, the principle used for communication in the direction from the portable module 20 to the base station 10 (reception phase) may be considered as being a load modulation. During this modulation, the mobile module 20 varies the apparent load that appears on the antenna 25. Due to inductive coupling between this antenna 25 and the base antenna 11, this results in a variation of the impedance of the base antenna 11.

Therefore, this modulation induces a variation of the amplitude and/or phase of the carrier frequency that is used in the reception part 13 of the base station 10.

During the reception phase, the base station 10 continues to transmit the carrier without modulation, in order to supply energy to the mobile module.

The diagram for the reception part 13 of the base station 10 is independent of the diagram for the transmission part 12. As illustrated in FIG. 2, the reception module 23 may comprise the following in sequence:
a demodulation module 26,
a low frequency gain-filter module 27,
a digitization module 28,
a digital processing module 29.

The signal to be demodulated is sampled at node A, directly on the antenna 11. The demodulation module 26 does the RF demodulation to eliminate the carrier frequency permanently present on the input signal for transmission of energy to the mobile module 20. It converts the modulation output from the mobile module 20 into base band. This module 26 may comprise any means known to those skilled in the art for amplitude demodulation, such as mixers in quadrature, a self-synchronous demodulator, a diode demodulator, etc.

The low frequency gain-filter module 27 amplifies and filters the base band signal to eliminate any parasites before it is digitized by the digitization module 28.

The digital signal thus obtained is then processed by the digital processing module 29 according to the protocol and modulation-coding used to obtain the original digital information transmitted by the mobile module 20.

The characteristics defined above are described in two documents according to known art, namely patent application FR 2 808 941 and U.S. Pat. No. 6,049,292.

Patent application FR 2 808 941 describes a terminal for the generation of an electromagnetic field capable of communicating with at least one transponder. This type of terminal comprises:
- an oscillation circuit capable of being excited by a remote power supply signal from the transponder,
- an amplitude demodulator to detect any data transmitted by the transponder,
- means of regulating the phase of the signal in the oscillation circuit of the terminal on a reference value,
- means of measuring magnitudes related to the current in the oscillation circuit and to the voltage at its terminals, and
- means of comparison of current values of these magnitudes with predetermined values, in order to determine if a transponder is present.

U.S. Pat. No. 6,049,292 describes a process for transmission of information between a passive transponder and a base station that uses a load modulation in the transponder. The coils of resonant circuits existing at the base station and in the transponder are coupled to each other, these resonant circuits being matched to the carrier frequency of the base station such that the load modulation of the resonant circuit in the transponder influences the current in the resonant circuit of the base station.

The main problem that arises with this type of device according to known art is a problem with the voltage detection sensitivity, when it is required to transmit maximum power to the load consisting of the antenna 11 at the base station.

The purpose of the invention is to solve this type of problem by proposing a new architecture of an RF transmission-reception device, for example a base station that takes account of the specific features of the signal to be analyzed in reception with respect to transmission, while allowing optimum detection of the signal in reception.

PRESENTATION OF THE INVENTION

The invention relates to an RF transmission-reception device, for example a base station for the generation of an electromagnetic field to communicate with at least one portable module entering this field, comprising:
- an antenna,
- a transmission part that includes a power amplifier that outputs an RF signal with modulated power to the antenna,
- a reception part,
- a digital processing and interface module, characterized in that the input signal at the reception part is picked up by taking a current sample at a power supply regulator to generate an image current of the current amplitude output by the antenna to the power amplifier.

Advantageously, the power supply regulator is an LDO type voltage regulator that includes:
- a first PMOS type main regulation transistor,
- a second PMOS type transistor, the size of which is an integer sub-multiple of the size of the first transistor and the length of which is identical to the length of the first transistor,
- a differential amplifier, and
- a resistance bridge.

Advantageously, the reception part comprises the following in sequence:
- a low frequency gain-filter module,
- a digitization module,
- a digital processing module.

There are many advantages of such an RF transmission-reception device:
- simplified reception,
- improved detection sensitivity,
- elimination of the RF signal input pin. The adaptor module of the input signal is no longer necessary, which eliminates constraints on the filter module and on the antenna and reduces manufacturing costs. Furthermore, risks of injecting parasites, coupling, etc., on the high sensitivity node are lower.

The invention can advantageously be used in making integrated circuits with the function of making RFID system base stations, and also any RF communication system for which compactness and integration are important criteria.

Connections between the modules are not shown exhaustively in detail on these block diagrams, and the arrows simply indicate the direction of the main information transported by the connection wires between these modules.

DETAILED PRESENTATION OF PARTICULAR EMBODIMENTS

Figure 3:
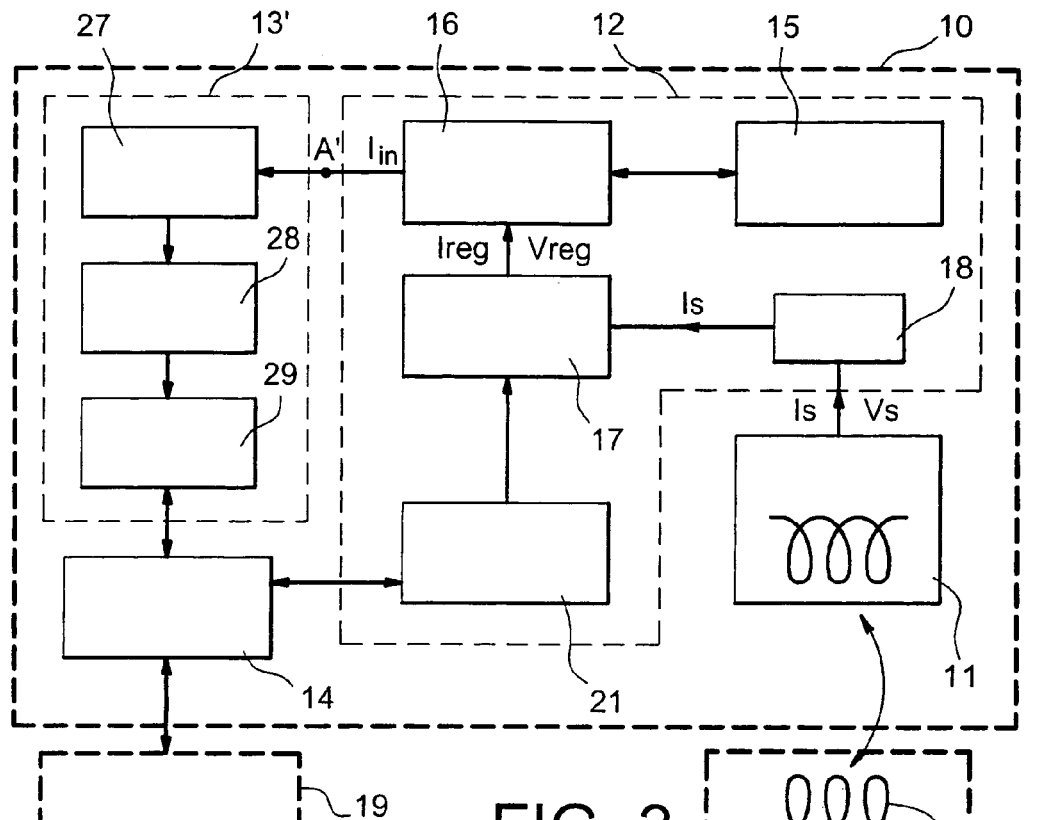
FIG. 3 illustrates the general block diagram of a base station according to the invention.

FIG. 3 illustrates the general block diagram of an RF transmission-reception device according to the invention, which in this case is a base station. Modules already shown in FIG. 1 have the same reference on this figure. Since these modules have also already been described, they will not be described again below.

As described above, the signal that reaches this base station 10 is composed of a carrier with its natural frequency, for which the amplitude is modulated at another frequency, this amplitude modulation carrying information received from the portable module 20.

The input signal for the reception part 13' is sampled firstly in voltage at the antenna 11 (node A in FIG. 1) and is now sampled by current sampling at the power supply regulator 16 (node A').

Figure 4:
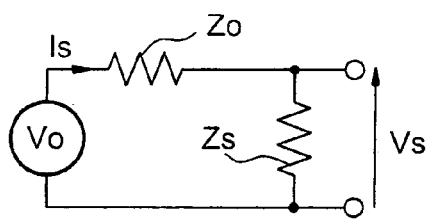
FIG. 4 illustrates an impedance scheme for the transmission part of the base station according to the invention.

If the transmission part 12 is considered to be a voltage generator Vo at an impedance Zo connected to an impedance load Zs, as illustrated in FIG. 4, the relative sensitivity of the voltage Vs with respect to the relative variation of Zs is expressed by the following relation:

$$dVs/Vs * Zs/dZs = Zo/(Zo+Zs).$$

The relative sensitivity of the current Is in Zo compared with the relative variation of Zs is expressed by the following relation:

$$dIs/Is * Zs/dZs = -Zs/(Zo+Zs).$$

Thus, when there is a power amplifier 17 with an output impedance Zo less than or equal to the load impedance Zs, it is more useful to analyze the received signal related to the current output Is, rather than the voltage Vs output to the load.

This current Is at the input to the power amplifier 17, as illustrated in FIG. 3, is such that Is=Im sin ωt where ω is the angular frequency of the carrier and Im is the amplitude of the current output to the load 11 and that reflects modulations of the signal transmitted by the module 20. The current Ireg is the current drawn by the power amplifier 17 on the power supply regulator 16 under a voltage Vreg internal to this regulator, which itself is powered by an external source Vcc. Ireg supplies Is to the load 11 that can thus transmit the carrier and therefore supply power to the mobile module 20.

The power amplifier 17 imposes variations to the current Ireg, with a value proportional to the value of the amplitude Im that it receives.

Figure 1:
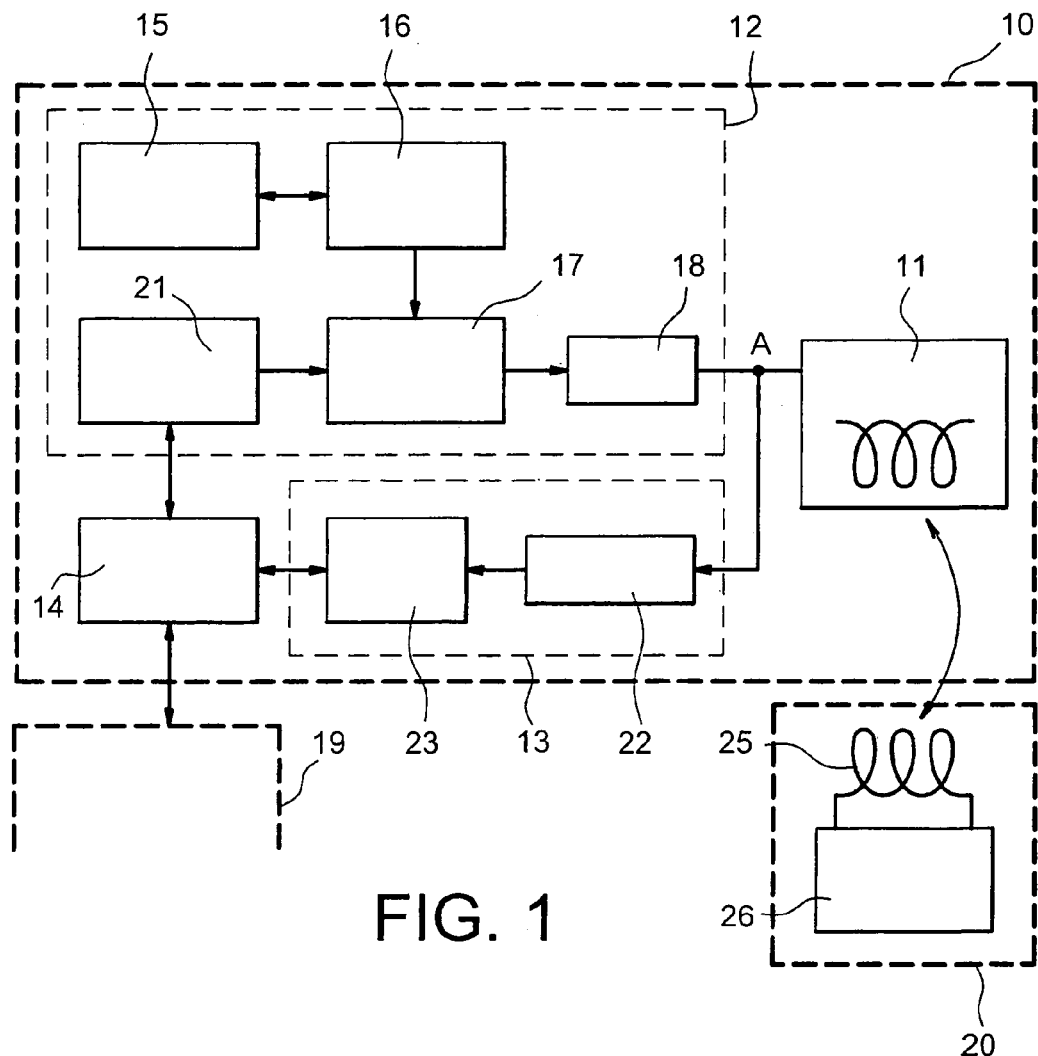
FIG. 1 illustrates the main block diagram of a system according to known art.
Figure 2:
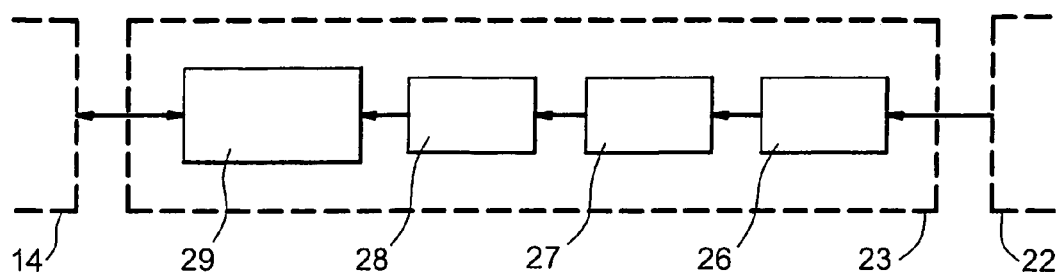
FIG. 2 illustrates the reception part of the system according to known art in FIG. 1.

Thus, during a reception phase, the RF demodulation of the signal received by the base station 10 is made on the current Is by the power amplifier 17. This demodulated signal is transported by Ireg. Since the power supply regulator module 16 outputs Ireg, there must be a sufficient passband to enable reception of the signal output from the mobile module 20. The RF demodulation module 26 in FIG. 1 is no longer necessary. The regulator then generates a current Iin that is the image of Ireg to the processing circuit 13' to process the information. This current Iin is proportional to Ireg and therefore to Im.

The signal is advantageously processed afterwards in the low frequency gain-filter module 27 and the digitization module 28 in current mode, since primary information in current is available. But this processing may be done in voltage after converting the current carrying the information into voltage.

The different modules making up the base station according to the invention are made in a manner known to those skilled in the art and therefore they will not be described in detail here.

Figure 5:
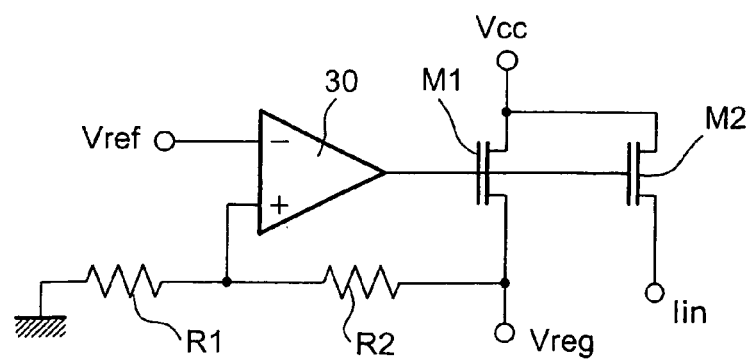
FIG. 5 illustrates a principle diagram for the power supply of the power amplifier of the transmission part of the base station according to the invention, including sampling of the current.

FIG. 5 illustrates a single example embodiment of the power supply regulator 16, using an LDO (Low Drop out) type voltage regulator. In this example, the main regulation transistor M1 is of the PMOS type. M2 is a transistor of the same type for which the size (W) is an integer sub-multiple of the size of the transistor M1, and for which length L is identical. Thus, the main current of several tens of milliamperes used by the amplifier 17 is corrected to a value that is 20 to 100 times smaller so that it can be used by the reception part 13' on the pin Iin. A resistance bridge R1, R2 divides the regulated voltage signal Vreg to slave a differential amplifier 30 to a reference voltage Vref. This voltage Vreg is used as a power supply voltage for the power amplifier 17.

Other regulators known to those skilled in the art could be used and simply adapted.

The invention claimed is:

1. RF transmission-reception device comprising:
    an antenna;
    a transmission part that includes a power amplifier that outputs an RF signal with modulated power to the antenna;
    a reception part;
    a digital processing and interface module; and
    a power supply regulator configured to generate an image current in accordance with a current amplitude received on the antenna;
    wherein an input signal at the reception part is picked up by taking a current sample at the power supply regulator to generate the image current of the current amplitude output by the antenna.

2. Device according to claim 1, further comprising a base station for the generation of an electromagnetic field to communicate with at least one portable module entering this field.

3. Device according to claim 1, wherein the power supply regulator comprises an LDO type voltage regulator, that includes:
    a first PMOS type main regulation transistor;
    a second PMOS type transistor, the size of which is an integer sub-multiple of the size of the first transistor and the length of which is identical to the length of the first transistor;
    a differential amplifier; and
    a resistance bridge.

4. Device according to claim 1, wherein the reception part comprises the following in sequence:
    a low frequency gain-filter module;
    a digitization module; and
    a digital processing module.

* * * * *